United States Patent
Kero

(10) Patent No.: US 10,494,189 B2
(45) Date of Patent: Dec. 3, 2019

(54) APPARATUS FOR MULTI-AXIAL TRANSFER OF OBJECTS IN ASSEMBLY LINES

(71) Applicant: Tesla, Inc., Palo Alto, CA (US)

(72) Inventor: Fasil Mulatu Kero, Fremont, CA (US)

(73) Assignee: Tesla, Inc., Palo Alto, CA (US)

( * ) Notice: Subject to any disclaimer, the term of this patent is extended or adjusted under 35 U.S.C. 154(b) by 0 days.

(21) Appl. No.: 15/927,434

(22) Filed: Mar. 21, 2018

(65) Prior Publication Data
US 2019/0291963 A1 Sep. 26, 2019

(51) Int. Cl.
*B65G 23/00* (2006.01)
*B65G 23/34* (2006.01)
*B65G 37/00* (2006.01)
*B65G 43/08* (2006.01)

(52) U.S. Cl.
CPC .......... *B65G 37/005* (2013.01); *B65G 23/34* (2013.01); *B65G 43/08* (2013.01); *B65G 2203/0216* (2013.01); *B65G 2203/0233* (2013.01); *B65G 2203/044* (2013.01); *B65G 2203/045* (2013.01)

(58) Field of Classification Search
None
See application file for complete search history.

(56) References Cited

U.S. PATENT DOCUMENTS

| 4,641,742 | A | * | 2/1987 | Igarashi | B65G 15/105 198/626.5 |
| 4,844,231 | A | * | 7/1989 | Usui | B65G 13/07 198/345.3 |
| 5,197,844 | A | * | 3/1993 | Lichti, Sr. | B65G 1/127 198/867.01 |
| RE35,851 | E | * | 7/1998 | Collins | B65G 47/263 198/781.04 |
| 7,497,316 | B2 | * | 3/2009 | Hysell | B65G 47/844 198/370.02 |
| 2002/0092734 | A1 | * | 7/2002 | Troupos | B65G 47/54 198/809 |

* cited by examiner

*Primary Examiner* — Kavel Singh
(74) *Attorney, Agent, or Firm* — Knobbe, Martens, Olson & Bear, LLP

(57) ABSTRACT

An apparatus for multi-axial transfer of objects in assembly line includes a first conveyor assembly, a second conveyor assembly, a first drive assembly, and a pivot point arrangement. The first conveyor assembly includes a plurality of rollers in a horizontal plane. The second conveyor assembly includes a plurality of geared chain arrangements mounted on at least one drive shaft. At least one of the plurality of rollers and the at least one drive shaft are coupled to the bevel gear arrangement. The first drive assembly includes a first motor coupled to the bevel gear arrangement to cause movement of an object in contact with the first conveyor assembly and the second conveyor assembly along a first axis and a second axis in the horizontal plane, respectively. The plurality of geared chain arrangements are movable along a third axis in a vertical plane using the pivot point arrangement.

19 Claims, 9 Drawing Sheets

APPARATUS FOR MULTI-AXIAL TRANSFER OF OBJECTS IN ASSEMBLY LINES

FIELD

Various embodiments of the disclosure relate to transfer and conveying apparatus for objects. More specifically, various embodiments of the disclosure relate to an apparatus having a compact and power efficient architecture for multi-axial transfer of objects in an assembly line.

BACKGROUND

Advancements in goods transfer and conveyance infrastructure related technologies have pushed for development of transfer systems associated with transfer and distribution of goods in assembly lines. Different transfer devices or carts are usually deployed to automate movement of goods along different sections and in different directions of a facility, for example, a manufacturing facility, an automotive assembly line, a packaging facility, a storage facility, and the like. Conventionally, multiple transfer devices or carts are employed in a facility to transfer goods in different directions. Such transfer devices may include multiple conveyor assemblies that may be stacked in parallel, series, or in tandem to other conveyor assemblies.

In certain scenarios, a transfer device may be required to shuttle along a fixed travel path on a track. Typically, in such scenarios, the movement of loads by the transfer device is limited to back and forth movement on the track. Any additional requirement to move the loads in different directions requires installation of additional tracks in different travel paths or additional transfer devices. In some cases, the same transfer device may be installed with separate driving assemblies, multiple motors, and conveyor assemblies to handle movement of the loads in different directions. However, as a result of inefficient arrangement of different components, for example, different motors and drive shafts for different conveyor assemblies, the size of the transfer device may increase drastically. Further, because of this large size and the use of separate driving assemblies for each conveyor assembly that transfer goods in a specific direction, the power consumption and maintenance cost of an individual transfer device may scale up, which may be undesirable. Further, the space occupied by different driving assemblies may render such transfer device(s) inapt for facilities that have a limited space for distribution of goods. Additionally, conventional transfer devices are designed to handle goods of a specific size or a limited size range. Such transfer device may require frequent reconfiguration to handle goods of different sizes resulting in sub-optimal performance in facilities that have space constraints for conveyor assemblies and variable size constraints for goods. Therefore, facilities that frequently handle goods of different sizes may prefer an integrated and compact solution as compared to a transfer device that requires frequent reconfiguration and setup for different goods sizes.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An apparatus for multi-axial transfer of objects in an assembly line is substantially shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed apparatus for multi-axial transfer of objects in an assembly line. The disclosed apparatus may advantageously facilitate transfer or distribution of objects through an integrated conveyor assembly that may be controlled to transfer the objects in different directions (or axes) in the horizontal plane and the vertical plane, for example, +X-axis, −X-axis, +Y-axis, −Y axis, +Z-axis, and −Z-axis. The objects may be automatically collected and transferred in different directions (or axes), even while the apparatus moves along a fixed travel path on a linear or a non-linear track. The disclosed apparatus may also be referred to as a transfer cart. The disclosed apparatus enables simplified receipt and transfer of objects of different sizes via stoppers (or transfer guide points) on the integrated conveyor assembly. Further, the apparatus includes a bevel gear arrangement and a single drive assembly, which comprises a single motor coupled to the bevel gear arrangement that facilitates bidirectional and bi-axial movement (or transfer) of objects in contact with the integrated conveyor assembly.

The apparatus may utilize a single motor based pulley arrangement to raise or lower the integrated conveyor assembly in the vertical plane. The apparatus may further control the movement of the objects in the horizontal plane at the same time based on a control of a direction of rotation of the bevel gear arrangement. A pivot point arrangement in the apparatus may further facilitate a single integrated assembly (such as the integrated conveyor assembly) in contact with an object to switch the contact between a first conveyor assembly to a second conveyor assembly that is integrated with the first conveyor assembly. The first conveyor assembly may transfer an object along a first axis and the second integrated conveyor assembly may transfer the object along an axis different (or orthogonal) to the first axis. The apparatus has a compact architecture and provides a weight and performance optimized solution for multi-axial transfer of goods. Such solution may be obtained by use of a single motor-based drive assembly to control the transfer of an object along two different axes and an integrated conveyor assembly that may switch contacts with the object for a transfer along different axes.

Figure 1A:
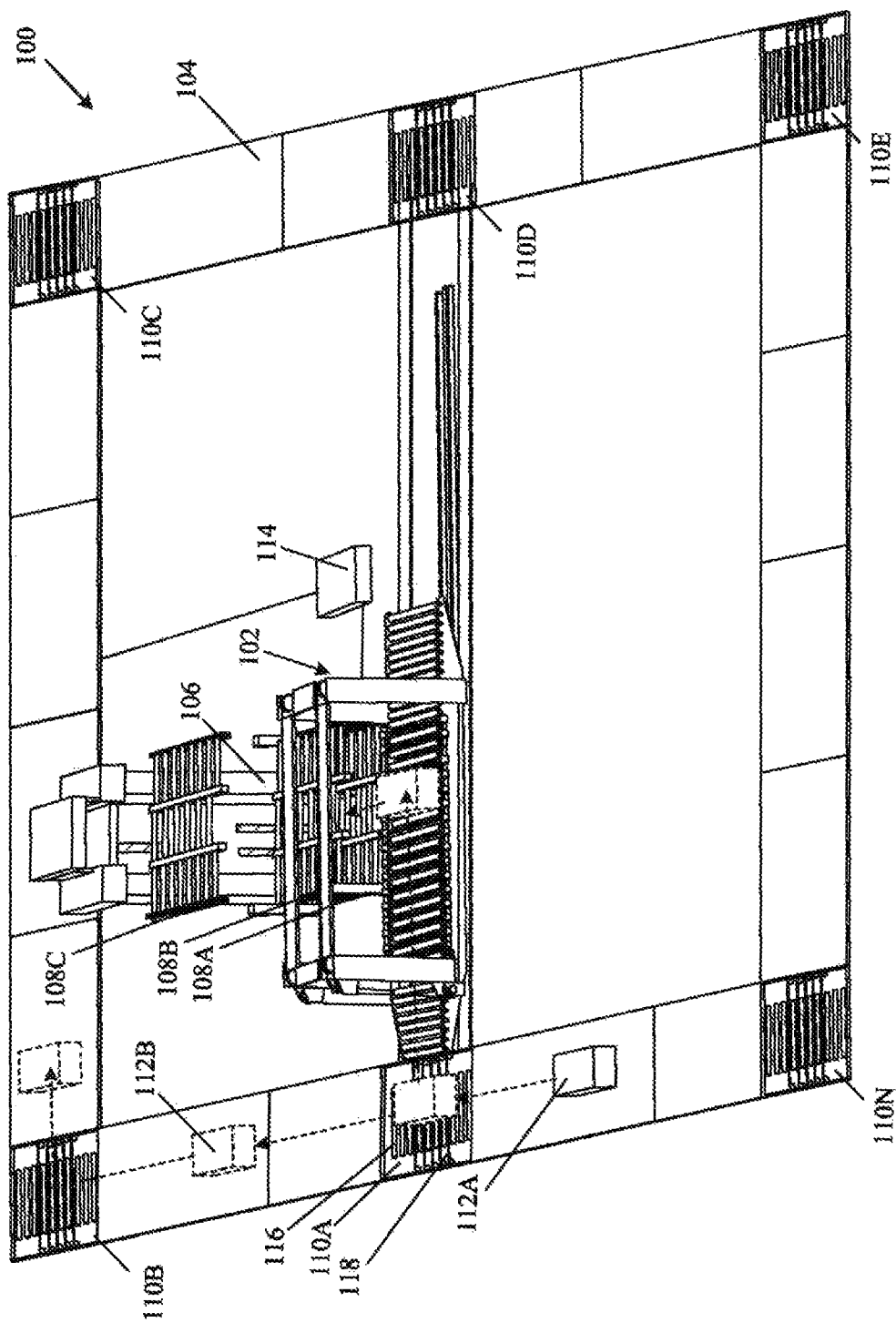
FIGS. 1A, 1B and 1C, collectively illustrate a conveyor system with an apparatus for multi-axial transfer of objects in an assembly line, in accordance with an embodiments of the disclosure.
Figure 1B:
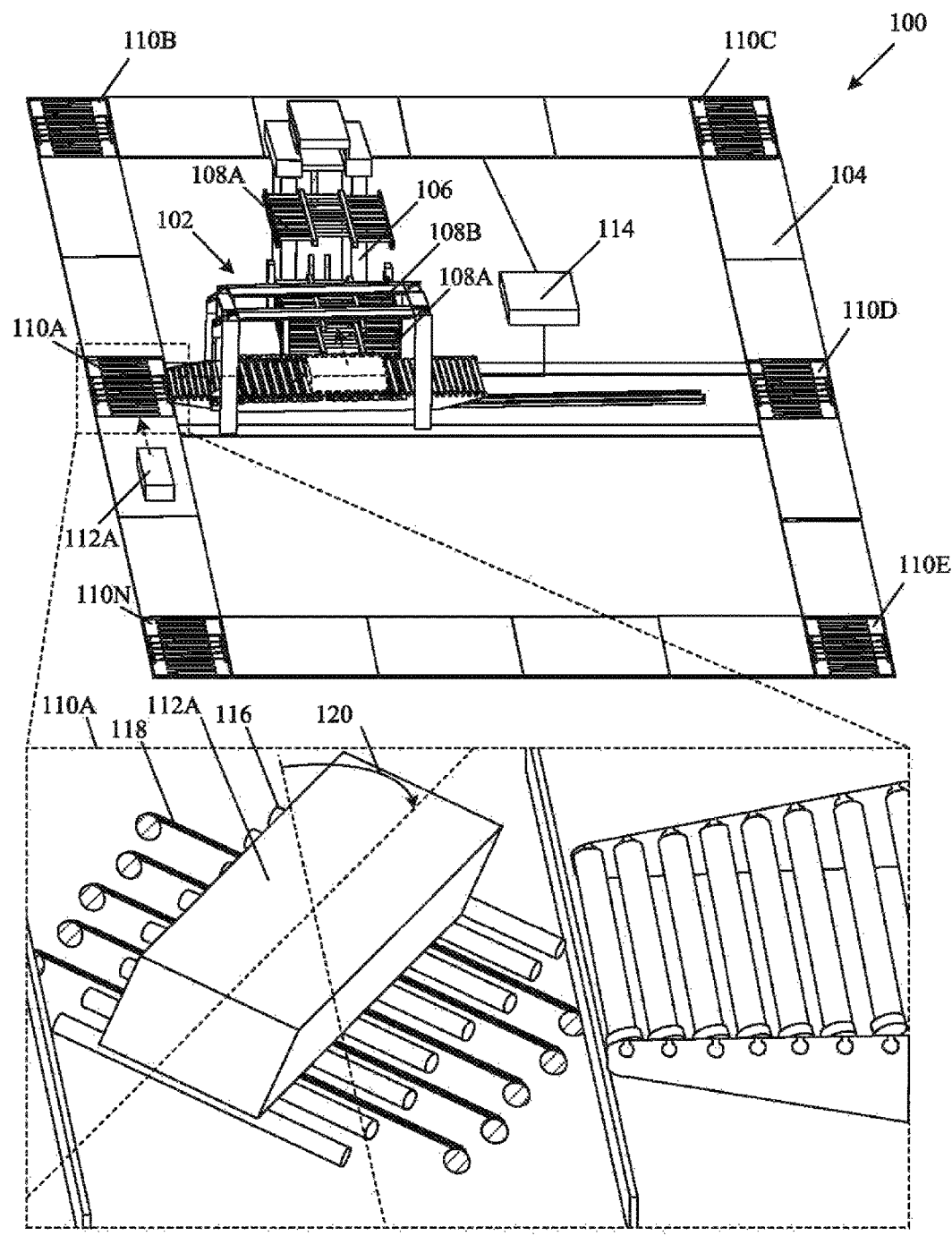
Figure 1C:
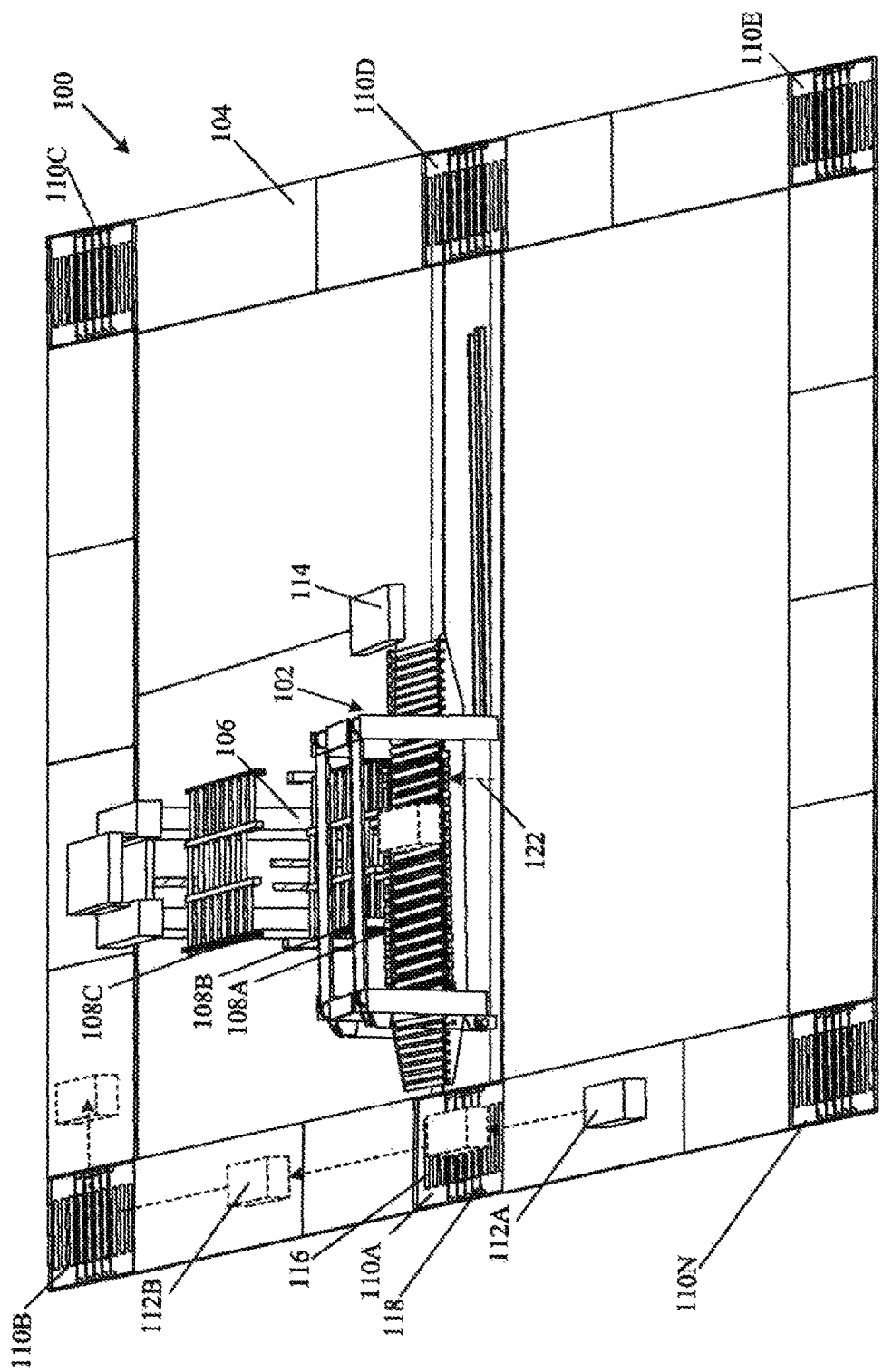

FIGS. 1A, 1B and 1C, collectively illustrate a conveyor system with an apparatus for multi-axial transfer of objects in an assembly line, in accordance with an embodiments of the disclosure. With reference to FIG. 1A, there is shown an assembly line setup 100 in a facility for automated and controlled movement of different objects. The assembly line setup 100 may include a transfer apparatus 102, a horizontal conveyor line 104, a vertical lift conveyor 106, and a set of horizontal conveyors 110A . . . 110N coupled to the horizontal conveyor line 104, and a control circuitry 114 to manage operations of different components of the assembly line setup 100. A plurality of objects (for example, a first object 112A and a second object 112B) may be sequentially transferred through the horizontal conveyor line 104.

The transfer apparatus 102 may be a compact transfer cart that may be controlled to operate in accordance with control instructions specified for each object (for example, the first object 112A) that may be received by the transfer apparatus 102, via the horizontal conveyor line 104. The transfer apparatus 102 may include an integrated conveyor assembly that may be driven by a single motor to transfer an object (for example, the first object 112A) horizontally along two different orthogonal axes. The transfer apparatus 102 may further include means to move the integrated conveyor assembly vertically in two different directions (i.e. lift up and lift down). Additionally, the transfer apparatus 102 may be mounted on a guide rail track to facilitate movement of the transfer apparatus 102 from one feeding point of the horizontal conveyor line 104 to different feeding points or distributions points associated with the horizontal conveyor line 104 and the vertical lift conveyor 106.

The horizontal conveyor line 104 may include a set of conveyor assemblies placed in a facility in accordance with a planned route for transfer, distribution, or retrieval of an object (for example, the first object 112A and the second object 112B). Each object may be routed through specific pay-points or zones in a facility based on synchronous and programmed operation of the horizontal conveyor line 104. The horizontal conveyor line 104 may receive control instructions that may define different operational parameters to apply with transfer or distribution of the object. Examples of the operational parameters may include, but are not limited to, speed of rotation of conveyor belts, direction of motion caused by the horizontal conveyor line 104, position of the object on the horizontal conveyor line, route specified for the object, and the like. Such control instructions may be unique for the object and may further depend on a specification of the object. For example, an object that weighs "170 lbs." may be a container that carries a delicate load that may be transferred with different operational parameters as compared to another object that weighs "50 lbs."

The vertical lift conveyor 106 may include a support arrangement coupled to a first lift 108A, a second lift 108B, and a third lift 108C, respectively. The support arrangement may include a drive mechanism (not shown) to selectively move the first lift 108A, the second lift 108B and the third lift 108C along the vertical plane, for example, in both lift-up and lift-down directions. Additionally, the drive mechanism may individually control motion of conveyors (rollers-based conveyors) in the first lift 108A, the second lift 108B, and the third lift 108C, respectively. The vertical lift conveyor 106 may provide vertical feed points or vertical transfer points for objects that may be handled by the transfer apparatus 102.

The set of horizontal conveyors 110A . . . 110N may be a set of integrated conveyor assemblies that may be coupled at different points on the horizontal conveyor line 104. Each integrated conveyor assembly, such as the horizontal conveyor 110A, may include a set of rollers 116 and a set of geared chain arrangements 118. Each geared chain arrangement of the set of geared chain arrangements 118 may be disposed in gaps between two rollers of set of rollers 116 to form an integrated conveyor assembly. The set of horizontal conveyors 110A . . . 110N may be placed at certain points at which a direction of movement of the object (for example, the first object 112A) requires a change with respect to a previous direction of movement of the object on the horizontal conveyor line 104. For example, one horizontal conveyor of the set of horizontal conveyors 110A . . . 110N may be placed at corners of the assembly line setup 100 or at points, at which a "90°" turn or angled movement for an object may be required in the assembly line setup 100, as shown. Each of the set of horizontal conveyors 110A . . . 110N may include a swivel mechanism to rotate at a specific angle (e.g. an angle 120 is shown in FIG. 1B) to selectively guide an object to a specific direction in the horizontal plane.

The first object 112A and the second object 112B may be transferrable goods or loads. In some embodiments, the first object 112A and the second object 112B may be enclosures that carry transferrable goods, for example, containers, packed boxes, unpacked products, and the like. The first object 112A and the second object 112B may be affixed with different radio frequency identification (RFID) tags. Each RFID tag may be associated with a unique identifier. The unique identifiers may be associated with a specific specification for each object that is to be transferred, such as the first object 112A and the second object 112B. The specification may include object handling parameters, object dimensions, contents, or details of object or material carried by the object, transfer routes for the object, and the like.

The control circuitry 114 may be part of a centralized control system that may be configured to set the operational parameters of different operational components in the assembly line setup 100. The operational parameters may be set in accordance with the specification of each object received at a reference entry point in the assembly line setup 100. The control circuitry 114 may be further associated with a plurality of object scanners (such as RFID readers) placed at different locations in the assembly line setup 100, for example, at the transfer apparatus 102, the horizontal conveyor line 104, the vertical lift conveyor 106, and the set of horizontal conveyors 110A . . . 110N. The control circuitry 114 may utilize the plurality of object scanners, to load the specification for each object that is received at the reference entry point in the assembly line setup 100. The control circuitry 114 may be implemented as a hardware circuitry or a programmable set of instructions executable by a hardware circuitry. Examples of the hardware circuitry may include, but are not limited to, hardware processors, Reduced Instruction Set/Complex Instruction Set computer (RISC/CISC), field programmable gate array (FPGA), and Application-Specific Integrated Circuit (ASIC).

In operation, a plurality of objects (for example, the first object 112A and the second object 112B) may be received at a reference entry point in vicinity of the assembly line setup 100 installed in a facility. Each of the first object 112A and the second object 112B may be affixed with an RFID tag (passive RFID tag or active RFID tag), which may be configured to transmit a unique identifier when excited by a control signal from an RFID reader associated with the control circuitry 114. The control circuitry 114 may be further configured to retrieve a specification associated with the unique identifier of the first object 112A and the second object 112B. Thereafter, the control circuitry 114 may be further configured to set the operational parameters of the horizontal conveyor line 104 to receive and transfer the first object 112A and the second object 112B along a specific designated/pre-planned route.

In accordance with the designated routes, the first object 112A may be transferred to the transfer apparatus 102, via a horizontal conveyor (e.g., a selected horizontal conveyor) of the set of horizontal conveyors 110A . . . 110N. Additionally, the second object 112B may be transferred to different transfer point bypassing the transfer apparatus 102. Each horizontal conveyor, such as the horizontal conveyor 110A, of the set of horizontal conveyors 110A . . . 110N may include a first conveyor portion that includes the set of rollers 116 engaged in rotation to cause motion of the first object 112A and the second object 112B along a specific axis (or direction) in the horizontal plane. Each horizontal conveyor, such as the horizontal conveyor 110A, may further include a second conveyor portion that includes the set of geared chain arrangements 118 disposed between the gaps present between two consecutively placed rollers. The first conveyor portion may have a first length span and the second conveyor portion may have a second length span.

In accordance with an embodiment, the operational configuration of each of the set of horizontal conveyors 110A . . . 110N may depend on the size of the object. The contact of the object is switched from the first conveyor portion to the second conveyor portion when the size of the object is similar to a span of the second conveyor portion (e.g., a geared chain arrangement based conveyor portion) and when the object requires a turn by a specific angle, for example, a "90°" turn. For example, the object may be required to move towards the transfer apparatus 102 based on object specification. The contact transition may be done based on a raise in a height of the set of geared chain arrangements 118 in the second conveyor portion vertically above a height level of the set of rollers 116. Thus, the first object 112A may be advantageously transferred to the transfer apparatus 102 without any reconfiguration of the assembly line setup 100 and the raised second conveyor portion may directly cause a change in direction of motion of the first object 112A at "90°" with respect to a previous direction of motion on the first conveyor portion.

With reference to FIG. 1B, there is shown the assembly line setup 100 depicting an enlarged view of one of the set of horizontal conveyors 110A . . . 110N. In accordance with an embodiment, the size of the first object 112A may be similar to a span (or dimension) of the first conveyor portion and the first object 112A may require a turn by a specific angle 120. An interim angle of "45°" caused by a swivel movement of the first conveyor portion of the horizontal conveyor 110A is represented by the specific angle 120 (as shown in FIG. 1B). The first conveyor portion of the horizontal conveyor 110A may be further rotated to achieve a 90° turn to move the first object 112a towards the transfer apparatus 102. Thus, the control circuitry 114 may be configured to control rotation of a horizontal conveyor, such as the horizontal conveyor 110A, by the specific angle 120, such as by "90°." In effect, the first object 112A in contact with the first conveyor portion may be moved at the specific angle 120 by the motion caused by the set of rollers 116 with respect to reference direction of motion (or a previous direction of motion along the horizontal conveyor line). The first object 112A may be transferred to the transfer apparatus 102 after the first object 112A has been turned by the desired specific angle 120.

The first object 112A may be further received at a reference point (or line) in vicinity of the transfer apparatus 102. The RFID reader associated with the control circuitry 114 may identify a unique identifier and a specification of the first object 112A. A set of photo sensors and rotary sensors (not shown) in the transfer apparatus 102 may be further utilized to identify a position of the first object 112A and a displacement of the first object 112A caused with respect to the reference point. The transfer apparatus 102 may utilize a first conveyor assembly that may include a plurality of rollers to transfer the object from a first section to a second section of the first conveyor assembly horizontally along a first axis, for example, +(−) x axis (as described in detail in FIG. 2A to 2I). A route may be assigned to the first object 112A through one of the first lift 108A, the second lift 108B, and the third lift 108C of the vertical lift conveyor 106. The second conveyor assembly may include a plurality of chain arrangements between gaps present in consecutive pair of rollers (as described in detail in FIG. 2A to 2I). The second conveyor assembly of the transfer apparatus 102 may be controlled to transfer the object along a second axis, which may be orthogonal to the first axis in the horizontal plane.

In accordance with an embodiment, the control circuitry 114 may be further configured to determine a section (or a region) of the first lift 108A, the second lift 108B, or the third lift 108C that may receive the first object 112A from the transfer apparatus 102. A set of stoppers (or transfer guide points) may be installed in the transfer apparatus. Further, the control circuitry 114 may raise the set of stoppers vertically above a plane of the first conveyor assembly or the second conveyor assembly. The set of stoppers may include at least one stopper that may hold the first object 112A at a specific location in the transfer apparatus 102 and may further restrict the motion of the first object 112A. The control circuitry 114 may further utilize the set of stoppers to selectively transfer the first object 112A in a specific region of the selected lift. As shown in FIGS. 1A and 1B, for example, the transfer apparatus 102 may utilize a stopper at the end of the second section of the first conveyor assembly to hold the object at the middle region of the first lift 108A.

As shown in FIG. 1C, for example, the first object 112A may be required to be routed to the second lift 108B or the third lift 108C. Therefore, the control circuitry 114 may be configured to control movement of the first conveyor assembly and the second conveyor assembly of the transfer apparatus 102 along a third axis in the vertical plane and at a height 122 (as shown in FIG. 1C) with respect to a base of the transfer apparatus 102. After the first object 112A is raised to the height 122 in contact with the first conveyor assembly, the control circuitry 114 may be configured to drive the plurality of geared belt arrangements in the second conveyor assembly to cause motion of the first object 112A in the direction of the second lift 108B or the third lift 108C (i.e. orthogonal to the first axis and the second axis). After the first object 112A has been unloaded from the first conveyor assembly, the control circuitry 114 may be configured to restore the arrangement of different components of the transfer apparatus 102 to an initial state. Thereafter, the control circuitry 114, by use of a photo sensor or a RFID reader, may scan or detect a next object that comes next in sequence of the plurality of objects and thus, the process may be recursively done without a manual reconfiguration of the assembly line setup 100, with each identified specification of an object in the sequence of objects.

Figure 2A:
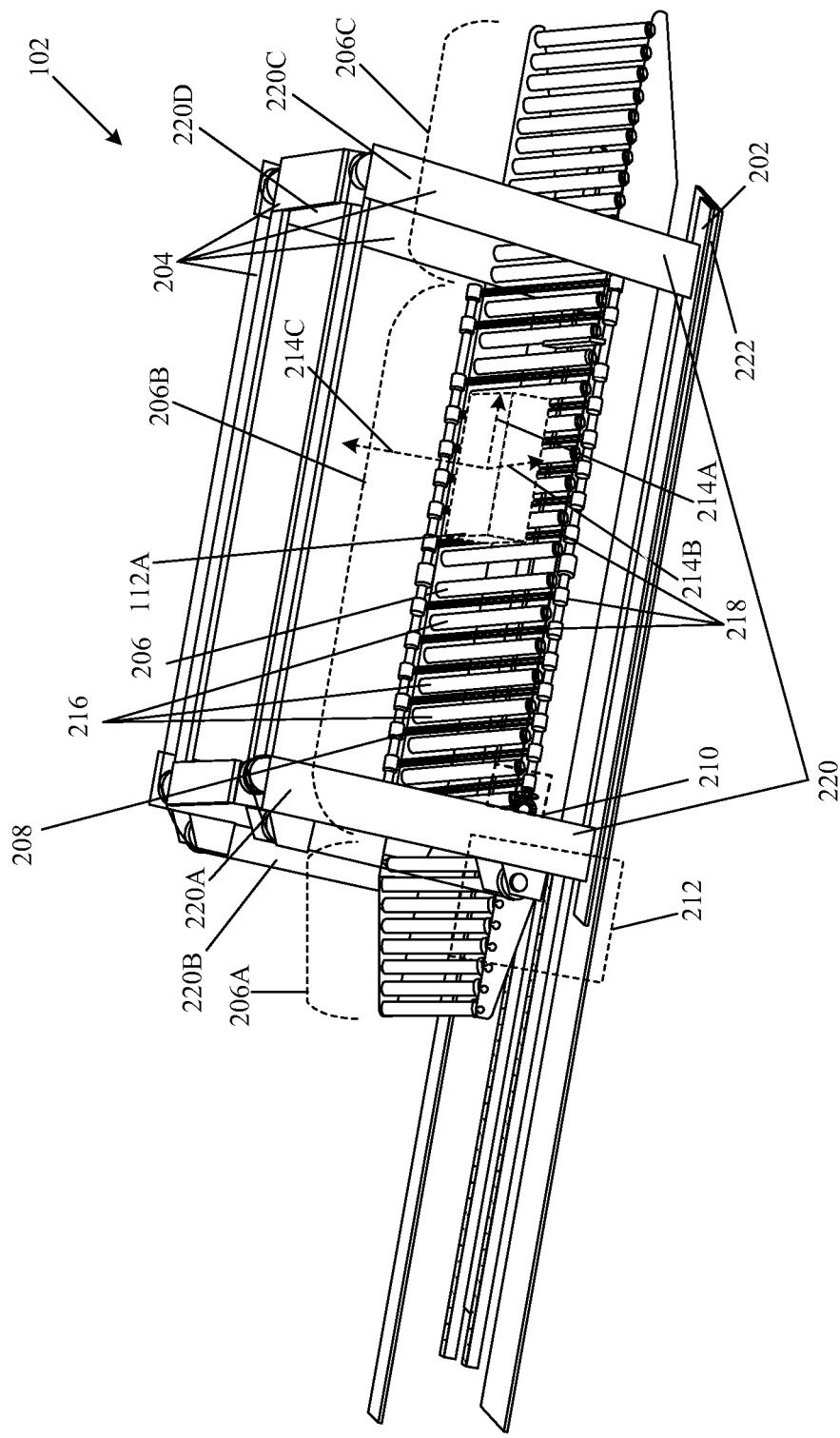
FIG. 2A illustrates an apparatus for multi-axial transfer of objects in an assembly line, in accordance with an embodiments of the disclosure.

FIG. 2A illustrates an apparatus for multi-axial transfer of objects in an assembly line, in accordance with an embodiments of the disclosure. FIG. 2A is described in conjunction with elements from FIGS. 1A, 1B, and 1C. With reference to FIG. 2A, there is shown the transfer apparatus 102 of FIG. 1A, FIG. 1B, and FIG. 1C. The transfer apparatus 102 may include a base plate 202, a frame 204, a first conveyor assembly 206, a second conveyor assembly 208, a bevel gear arrangement 210, and a pulley arrangement 212.

The transfer apparatus 102 may be a compact transfer cart that may include a conveyor mechanism. The conveyor mechanism may include the first conveyor assembly 206 and the second conveyor assembly 208. The conveyor mechanism may be controlled to cause movement of the first object 112A in contact with the first conveyor assembly 206 and the second conveyor assembly 208, along a first axis 214A, a second axis 214B, and a third axis 214C, respectively. The first axis 214A and the second axis 214B may be orthogonal axes in the horizontal plane and the third axis 214C may be another orthogonal axis in the vertical plane. The movement of the first object 112A may be further controlled along two different directions (i.e. forward and reverse directions) along an axis, such as the first axis 214A, the second axis 214B, and the third axis 214C.

The first conveyor assembly 206 may include a first section 206A, a second section 206B, and a third section 206C, which may be utilized to partition the first conveyor assembly 206 based on different operational configurations. The first section 206A and the third section 206C of the first conveyor assembly 206 may include a set of rollers 116 at either end of the first conveyor assembly 206. The second section 206B of the first conveyor assembly 206 may be integrated with the second conveyor assembly 208 and supported by a pivot point arrangement along the length of the first conveyor assembly 206.

The first conveyor assembly 206 may further include a plurality of rollers 216 arranged longitudinally to each other in the horizontal plane. The second conveyor assembly 208 may include a plurality of geared chain arrangements 218 disposed between two consecutive rollers in a specific section of the first conveyor assembly 206. The first conveyor assembly 206 and the second conveyor assembly 208 may be further supported by the pulley arrangement 212, which may be further coupled to a plurality of columns 220 in the frame 204 of the transfer apparatus 102. Such pulley arrangement 112 may facilitate the movement of the first conveyor assembly 206 and the second conveyor assembly 208 along the third axis 214C in the vertical plane. The transfer apparatus 102 may be mounted on a plurality of guide rail tracks 222 that may support back and forth movement of the transfer apparatus 102 in the horizontal plane. Such movement may further facilitate multi-axial transfer of objects while the transfer apparatus 102 is moving on a fixed track, such as the plurality of guide rail tracks 222.

Although not shown in FIG. 2A, the transfer apparatus 102 may further include a first drive assembly, a second drive assembly, a pivot point arrangement, and a wheel arrangement mounted on the plurality of guide rail tracks 222. The detailed description of different components of the transfer apparatus 102 has been further described in details, for example, in FIGS. 2B to 2I.

Figure 2B:
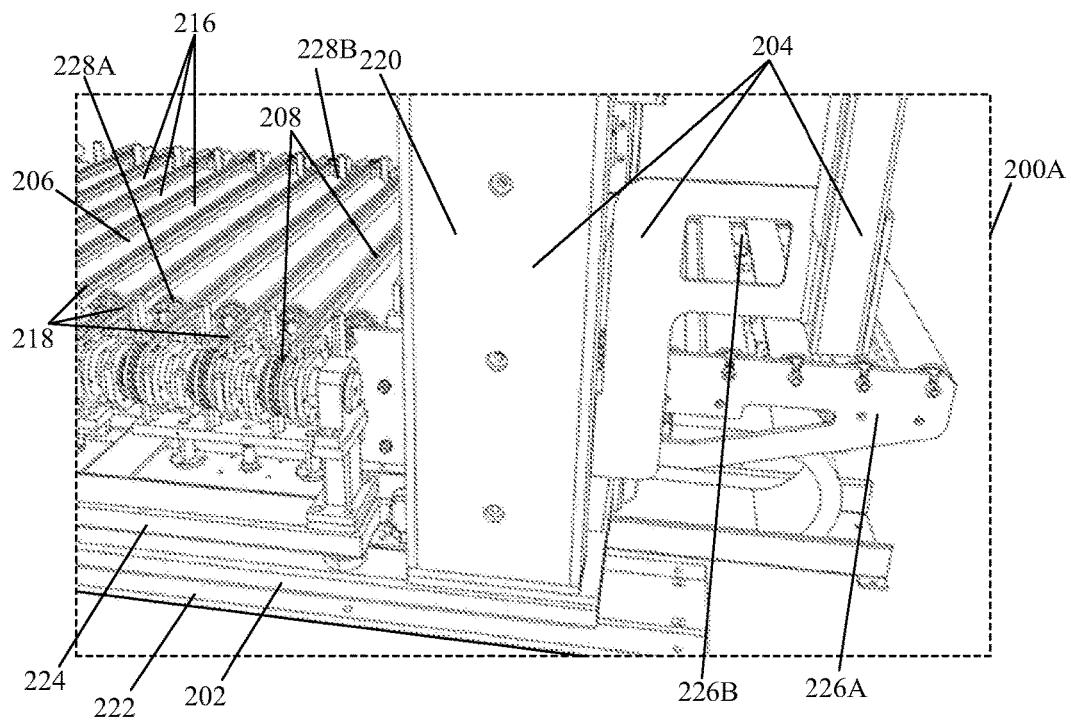
FIG. 2B illustrates a portion of a base plate, a first conveyor assembly and a second conveyor assembly of the transfer apparatus of FIG. 2A, in accordance with an embodiment of the disclosure.

FIG. 2B illustrates a portion of a base plate, a first conveyor assembly and a second conveyor assembly of the transfer apparatus of FIG. 2A, in accordance with an embodiment of the disclosure. FIG. 2B is explained in conjunction with elements from FIGS. 1A, 1B, 1C, and 2A. With reference to FIG. 2B, there is shown a first enlarged view 200A of the base plate 202, the first conveyor assembly 206, and the second conveyor assembly 208 of FIG. 2A. The first enlarged view 200A depicts the base plate 202, a conveyor support plate 224, a first support fixture 226A, a second support fixture 226B, the plurality of rollers 216, and the plurality of geared chain arrangements 218.

The base plate 202 of the transfer apparatus 102 may be a rectangular plate that may support the frame 204 coupled to (front or top side of) the base plate 202. The frame 204 may include the plurality of columns 220, such as a first column 220A, a second column 220B, a third column 220C, and a fourth column 220D. The plurality of columns 220 may be further affixed on the base plate 202 for support. Each column of the plurality of columns 220 is affixed with the pulley arrangement 212 associated with a second drive assembly (e.g., a second drive assembly 246 as shown in FIG. 2G). The base plate 202 may be further supported by a wheel arrangement (e.g., wheel arrangement 256 as shown in FIG. 2I) affixed at (i.e. bottom side of) the base plate 202.

The base plate 202 may further support the conveyor support plate 224 arranged at distinct corners of the base plate 202. The conveyor support plate 224 may provide support to the first support fixture 226A and the second support fixture 226B of the first conveyor assembly 206 and the second conveyor assembly 208. The second support fixture 226B may be arranged parallel to the first support fixture 226A. The first support fixture 226A may include a first plurality of grooves to hold components of the first conveyor assembly 206 and a second plurality of grooves disposed in gaps between the first plurality of grooves to hold components of the second conveyor assembly 208.

The first conveyor assembly 206 may include the plurality of rollers 216 arranged spatially and longitudinally to each other in a horizontal plane. The plurality of rollers 216 in the first conveyor assembly 206 may be mounted between the first support fixture 226A at a first distal end 228A and the second support fixture 226B at a second distal end 228B of the plurality of rollers 216. The second conveyor assembly 208 may include the plurality of geared chain arrangements 218. In accordance with an embodiment, each of the plurality of geared chain arrangements 218 may be arranged alternatively between two consecutive rollers of the plurality of rollers 216 in the second section 206B of the first conveyor assembly 206, as shown. The positioning of each geared chain arrangement between two consecutively placed rollers of the plurality of rollers 216 advantageously integrates two conveyor assemblies (i.e., the first conveyor assembly 206 and the second conveyor assembly 208) in compact arrangement without limiting multi-axial movement of an object.

Figure 2C:
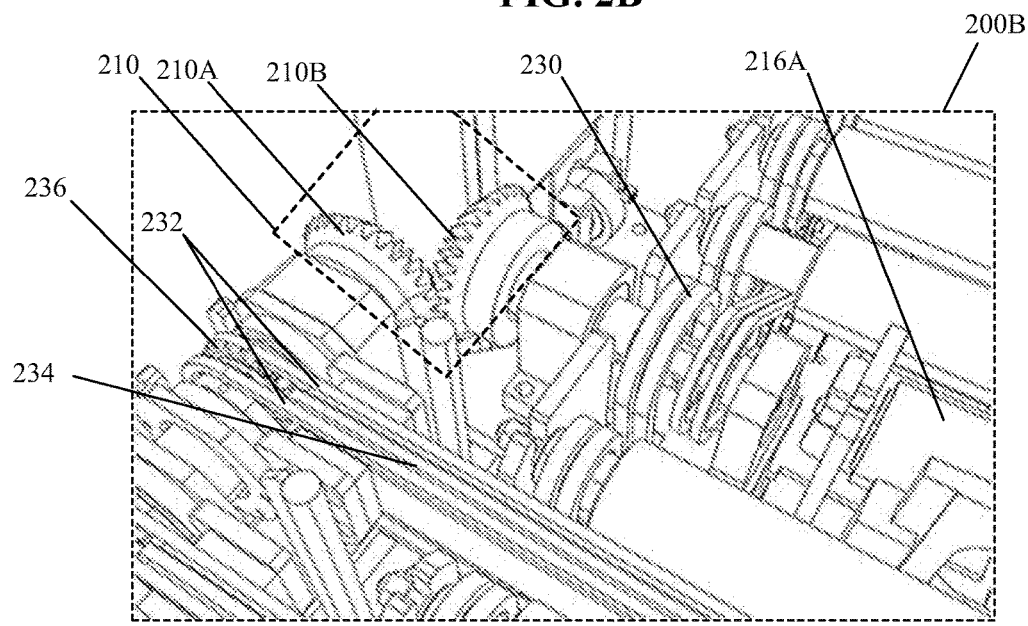
FIG. 2C illustrates a portion of a first conveyor assembly and a second conveyor assembly of the transfer apparatus of FIG. 2A with a bevel gear arrangement, in accordance with an embodiment of the disclosure.
Figure 2D:
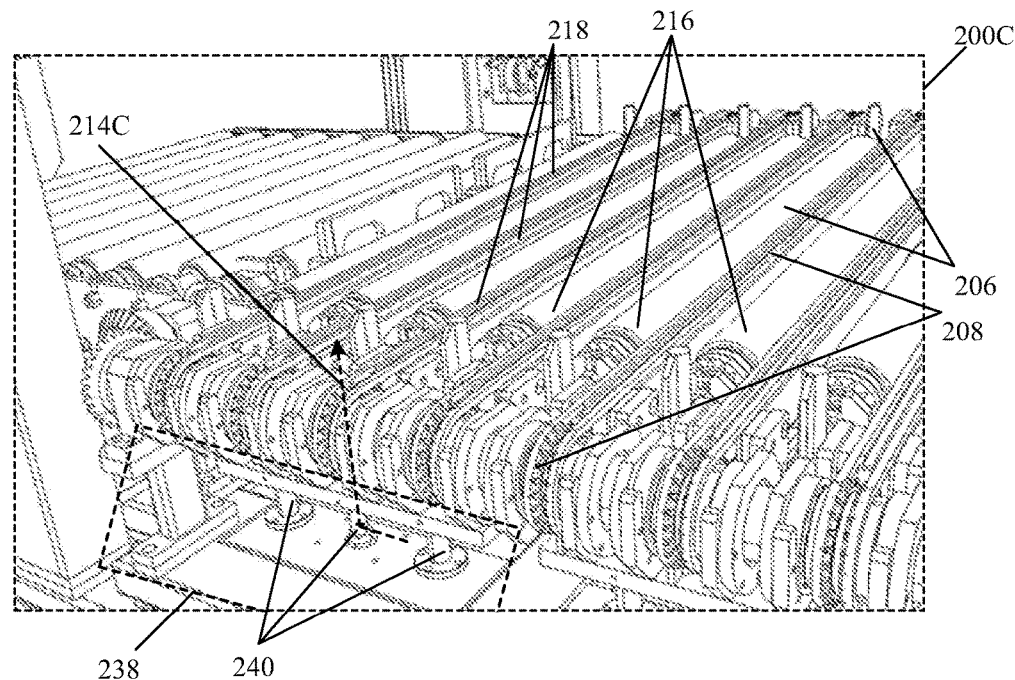
FIG. 2D illustrates a pivot point arrangement for a contact transition between the first conveyor assembly and the second conveyor assembly of the transfer cart of FIG. 2B, in accordance with an embodiment of the disclosure.

FIG. 2C illustrates a portion of a first conveyor assembly and a second conveyor assembly of the transfer apparatus of FIG. 2A with a bevel gear arrangement, in accordance with an embodiment of the disclosure. FIG. 2C is explained in conjunction with elements from FIGS. 1A, 1B, 1C, 2A, and 2B. With reference to FIG. 2C, there is shown a second enlarged view 200B of a portion of the transfer apparatus 102 depicting an arrangement of a bevel gear arrangement 210 in association with the first conveyor assembly 206 and the second conveyor assembly 208. The second enlarged view 200B depicts the base plate 202, the bevel gear arrangement 110, the plurality of rollers 216, and the plurality of geared chain arrangements 218, the conveyor support plate 224, the first support fixture 226A, and the second support fixture 226B.

Figure 2E:
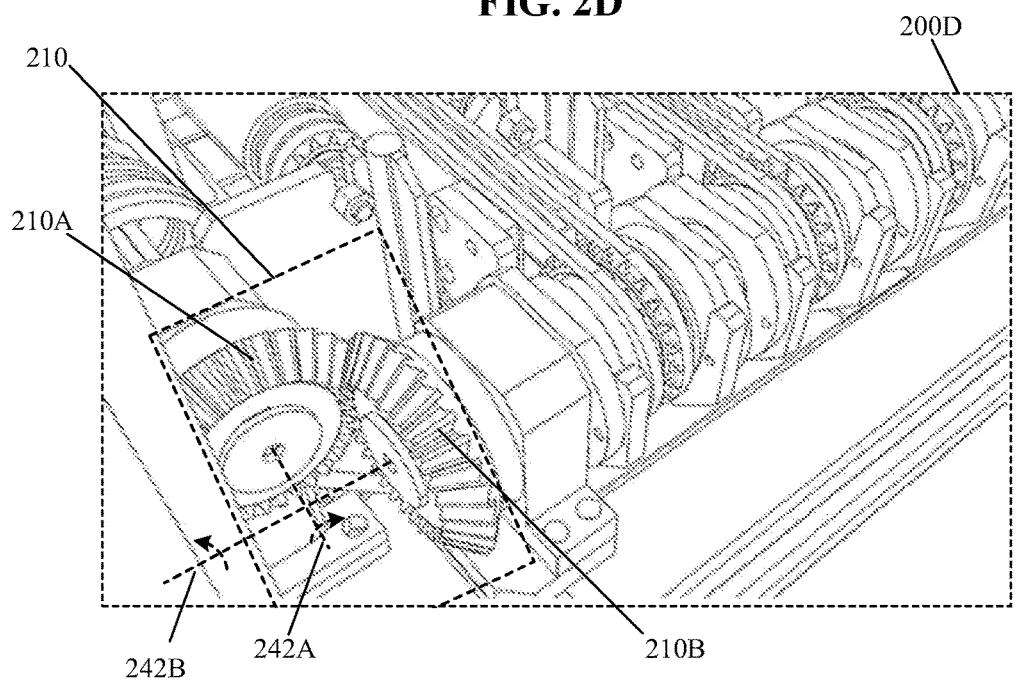
FIG. 2E illustrates a bevel gear arrangement that drives a first conveyor assembly and a second conveyor assembly of the transfer apparatus of FIG. 2A, in accordance with an embodiment of the disclosure.

In accordance with an embodiment, at least one of the plurality of rollers 216 may be coupled to the first gear 210A of the bevel gear arrangement 210 (also shown in FIG. 2E). The roller 216A coupled to the first gear 210A of the bevel gear arrangement 210 may be further linked to a drive belt 230. The drive belt 230 may be further linked to each roller affixed on the first support fixture 226A and the second support fixture 226B. The drive belt 230 (for example, a flat belt) may span along the length of the first conveyor assembly 206 in the horizontal plane in accordance with a specific arrangement pattern. The specific arrangement pattern may facilitate optimal transfer of torque to the plurality of the plurality of rollers 216 from rotation of the first gear 210A of the bevel gear arrangement 210.

The plurality of geared chain arrangements 218 (shown in FIG. 2B) may be mounted on at least one drive shaft, which may be further coupled to the second gear 210B of the bevel gear arrangement 210 (shown in FIG. 2C). Each geared chain arrangement may include a pair of belts 232 arranged on a grooved plate 234 (with grooves not visible from a top view) that spans from longitudinally along the length of a roller. Each distal end of the pair of belts 232 may be further linked to a teethed gear 236. The teethed gear 236 may include a pair of grooves at either side of the gear teeth to link the pair of belts 232 to the drive shaft associated with the second gear 210B of the bevel gear arrangement 210. Each teethed gear of a geared chain arrangement may be aligned such that an axis of rotation (for example, an axis of rotation 242B as shown in FIG. 2E) of the second gear 210B of the bevel gear arrangement 210 is axially aligned along a length of the first conveyor assembly 206.

FIG. 2D illustrates a portion of a transfer apparatus that depicts a detailed view of a pivot point arrangement for a contact transition between the first conveyor assembly and the second conveyor assembly of FIG. 2B, in accordance with an embodiment of the disclosure. FIG. 2D is explained in conjunction with elements from FIGS. 1A, 1B, 1C, 2A, 2B, and 2C. With reference to FIG. 2D, there is shown an enlarged view 200C. The enlarged view 200C depicts a pivot point arrangement 238 that controls rise of the plurality of geared chain arrangements 218 of the second conveyor assembly 208.

In active state, the plurality of geared chain arrangements 218 may be raised above a plane of contact based on the pivot point arrangement 238 coupled to the plurality of geared chain arrangements 218 of the second conveyor assembly 208. The plane of contact may correspond to an area that is formed based on contactable portions of the first conveyor assembly 206 and the second conveyor assembly 208 in the horizontal plane. In the active state, a contact of an object with the plurality of rollers 216 of the first conveyor assembly 206 may be switched from the plurality of rollers 216 to the raised plurality of geared chain arrangements 218. In accordance with an embodiment, such transition of contact may be done as the object may move from the first section 206A to the second section 206B of the first conveyor assembly 206. In accordance with another embodiment, such transition of contact may be facilitated in conjunction with a stopper. Thus, as a stopper may hold the object engaged in contact with the plurality of rollers 216 in the second section 206B of the first conveyor assembly 206, the plurality of geared chain arrangements 218 may be raised to switch contact of the object from the plurality of rollers 216 to the plurality of geared chain arrangement 218.

The contact transition from the plurality of rollers 216 to the plurality of geared chain arrangement 218 the may be brought upon by the pivot point arrangement 238. The pivot point arrangement 238 may include a plurality of pivot points 240 associated with the plurality of geared chain arrangements 218 of the second conveyor assembly 208. The plurality of pivot points 240 may be a plurality of vertical columns coupled at each distal end of the plurality of geared chain arrangements 218. The plurality of geared chain arrangements 218 may be movable along the third axis 214C in a vertical plane (for example, movable above and below a plane of contact with an object). The pivot point arrangement 238 may be driven by a driving mechanism to switch the contact of the object between the first conveyor assembly 206 and the second conveyor assembly 208.

In default state, the plurality of geared chain arrangements 218 of the second conveyor assembly 208 may be held below the plane of contact associated with the plurality of rollers 216 of the first conveyor assembly 206. Thus, in the default state, an object in contact with the plurality of rollers 216 of the first conveyor assembly 206 may retain contact with the plurality of rollers 216 throughout the first section 206A, the second section 206B, and the third section 206C of the first conveyor assembly 206. Such object may thus remain engaged in motion along the first axis 214A, without a change in axis.

FIG. 2E illustrates a bevel gear arrangement that drives a first conveyor assembly and a second conveyor assembly of the transfer apparatus 102 of FIG. 2A, in accordance with an embodiment of the disclosure. FIG. 2E is explained in conjunction with elements from FIGS. 1A, 1B, 1C, 2A, 2B, 2C, and 2D. With reference to FIG. 2E, there is shown an enlarged view 200D of the bevel gear arrangement 210 coupled to the first conveyor assembly 206 and the second conveyor assembly 208.

The bevel gear arrangement 210 may include the first gear 210A aligned along the first axis of rotation 242A of the bevel gear arrangement 210 and the second gear 210B aligned along a second axis of rotation 242B of the bevel gear arrangement 210. The first axis of the rotation 242A of the bevel gear arrangement 210 may be orthogonal to the second axis of rotation 242B of the bevel gear arrangement 210. Further, the first gear 210A may be coupled to a drivable component of the first conveyor assembly 206 and a direction of movement of an object placed on the first conveyor assembly 206 may be determined based on a type of rotation of the first gear 210A of the bevel gear arrangement 210. Similarly, the second gear 210B may be coupled to a drivable component of the second conveyor assembly 208 and a direction of movement of an object placed on the second conveyor assembly 208 may be determined based on a type of rotation of the second gear 210B of the bevel gear arrangement 210.

The bevel gear arrangement 210 may be further coupled to the first drive assembly. The first drive assembly may drive the bevel gear arrangement 210 selectively along the first axis of rotation 242A or the second axis of rotation 242B based on a required direction of motion for an object in contact with the first conveyor assembly 206 or the second conveyor assembly 208. The first drive assembly may include a first motor coupled to one of the first gear 210A or the second gear 210B of the bevel gear arrangement 210 (for example, the first motor is coupled to the first gear 210A through a geared belt arrangement). In accordance with an embodiment, the first motor of the first drive assembly may be further driven based on a rack and pinion gear arrangement disposed longitudinally along the length of the first conveyor assembly 206 and below a height of first conveyor assembly 206 from the base plate 202. The first motor may further drive the bevel gear arrangement 210 to cause movement of an object in contact with the first conveyor assembly 206 along the first axis 214A and the second conveyor assembly 208 along the second axis 214B in the horizontal plane. The movement of an object along the first axis 214A and the second axis 214B may be bidirectional, for example, an object may be moved in two opposite directions along the first axis 214A and the second axis 214B. The bidirectional movement of an object in contact with the first conveyor assembly 206 and the second conveyor assembly 208 may be further based on a clockwise or an anticlockwise rotation of the bevel gear arrangement 210.

Figure 2F:
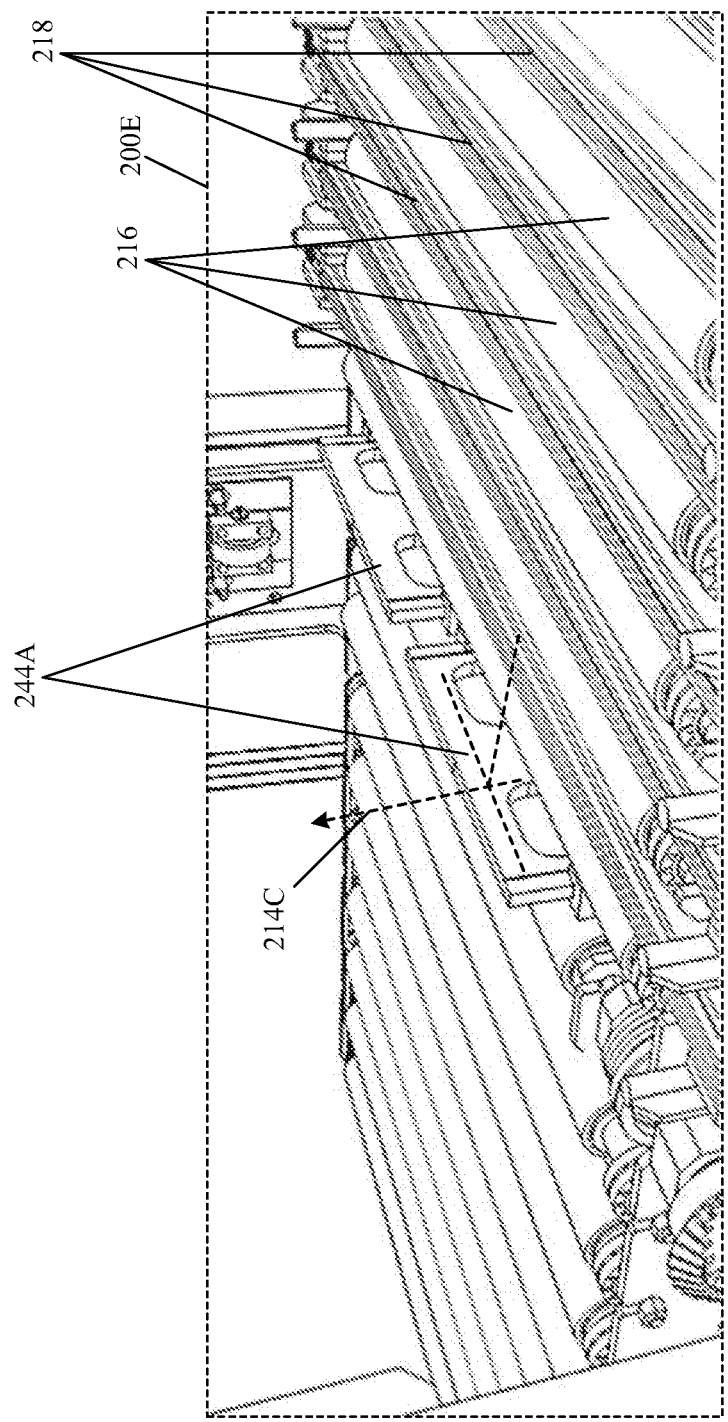
FIG. 2F illustrates a holding mechanism for an object in contact with the first conveyor assembly or the second conveyor assembly of FIG. 2B, in accordance with an embodiment of the disclosure.
Figure 2G:
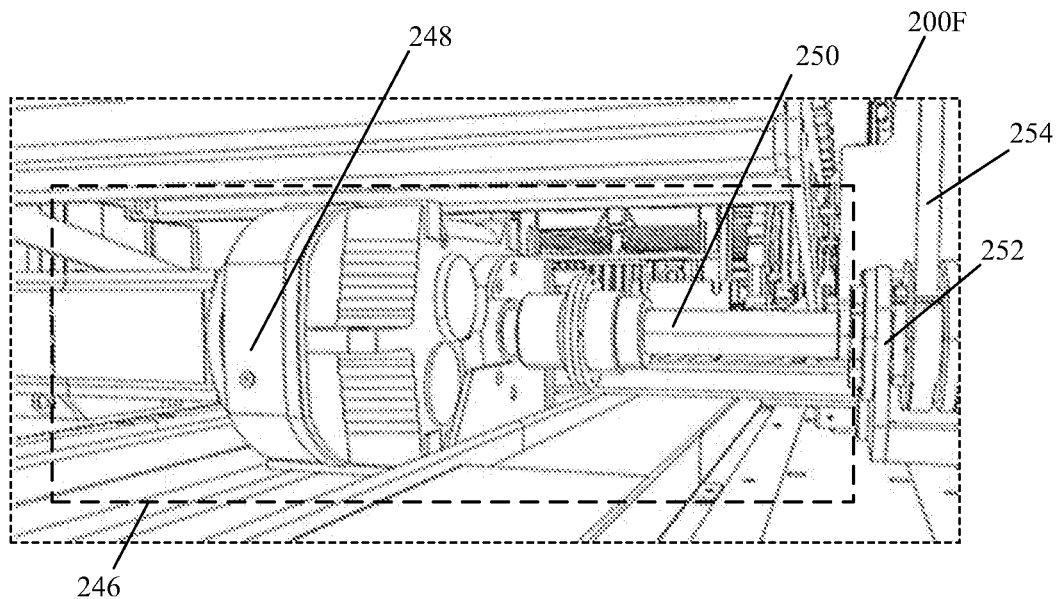
FIGS. 2G and 2H collectively, illustrate a lifting mechanism to move the first conveyor assembly and the second conveyor assembly of FIG. 2A in a vertical plane, in accordance with an embodiment of the disclosure.

FIG. 2F illustrates a holding mechanism for an object in contact with the first conveyor assembly or the second conveyor assembly, in accordance with an embodiment of the disclosure. FIG. 2F is explained in conjunction with elements from FIGS. 1A, 1B, 1C, 2A, 2B, 2C, 2D, and 2E. With reference to FIG. 2F, there is shown an enlarged view 200E of a holding mechanism for an object in contact with the first conveyor assembly 206 or the second conveyor assembly 208.

The first conveyor assembly 206 may include the holding mechanism to hold an object engaged in motion with the rotation of the plurality of rollers 216 within one of the first section 206A, the second section 206B or the third section 206C of the first conveyor assembly 206. The holding mechanism may include a first stopper 244A and a second stopper (not shown) arranged in gaps between two different pairs of rollers of the plurality of rollers 216. The first stopper 244A may be arranged at a defined separation from the second stopper. In accordance with an embodiment, the first stopper 244A and the second stopper may be arranged at two distal ends of the second section 206B of the first conveyor assembly 206. In default state, the first stopper 244A and the second stopper may be placed below a plane of contact formed by the plurality of rollers 216 of the first conveyor assembly 206. In active state, the first stopper 244A and the second stopper may be raised above the plane of contact to hold an object within the first section 206A or the second section 206B of the first conveyor assembly 206. The transfer apparatus 102 may further include an actuator (not shown). The first stopper 244A and the second stopper may be coupled to the actuator that may raise the first stopper 244A and the second stopper in the vertical plane.

The first stopper 244A and the second stopper may correspond to transfer guide points on the first conveyor assembly 206. Alternatively stated, an object may be held at a specific location on the first conveyor assembly 206 to manage transfer of different objects of different sizes. For example, an object engaged in motion along the first axis 214A may be designated for a transfer along the second axis 214B from a specific location on the first conveyor assembly 206. Therefore, the second stopper may be raised above the plane of contact to hold the object at a specific transfer guide point.

Figure 2H:
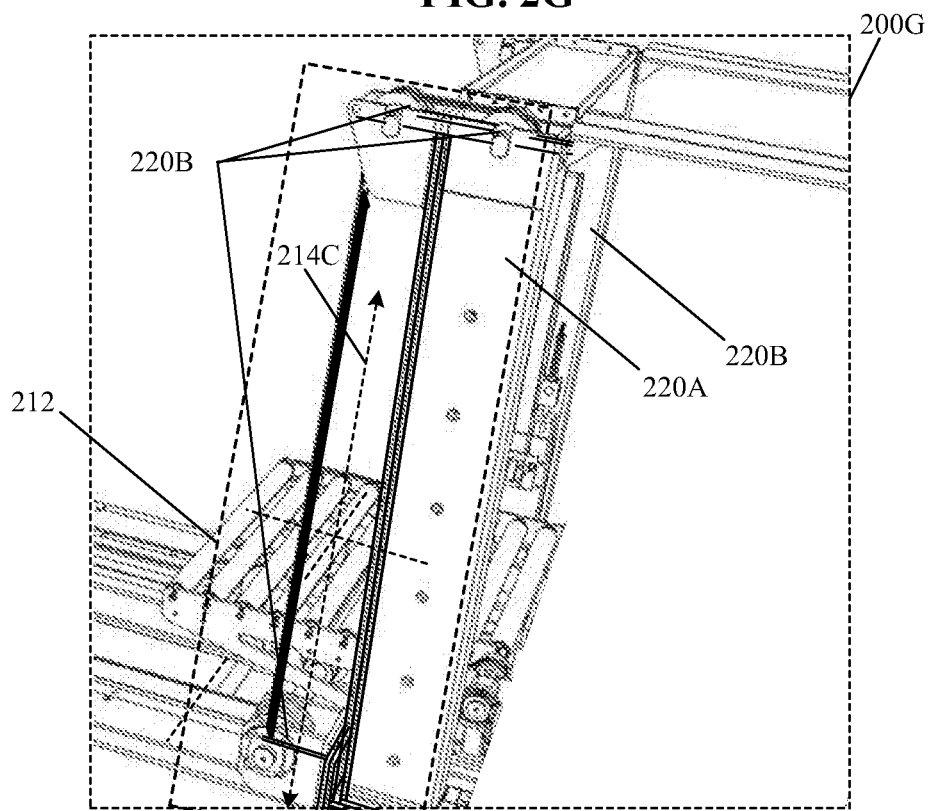
Figure 2I:
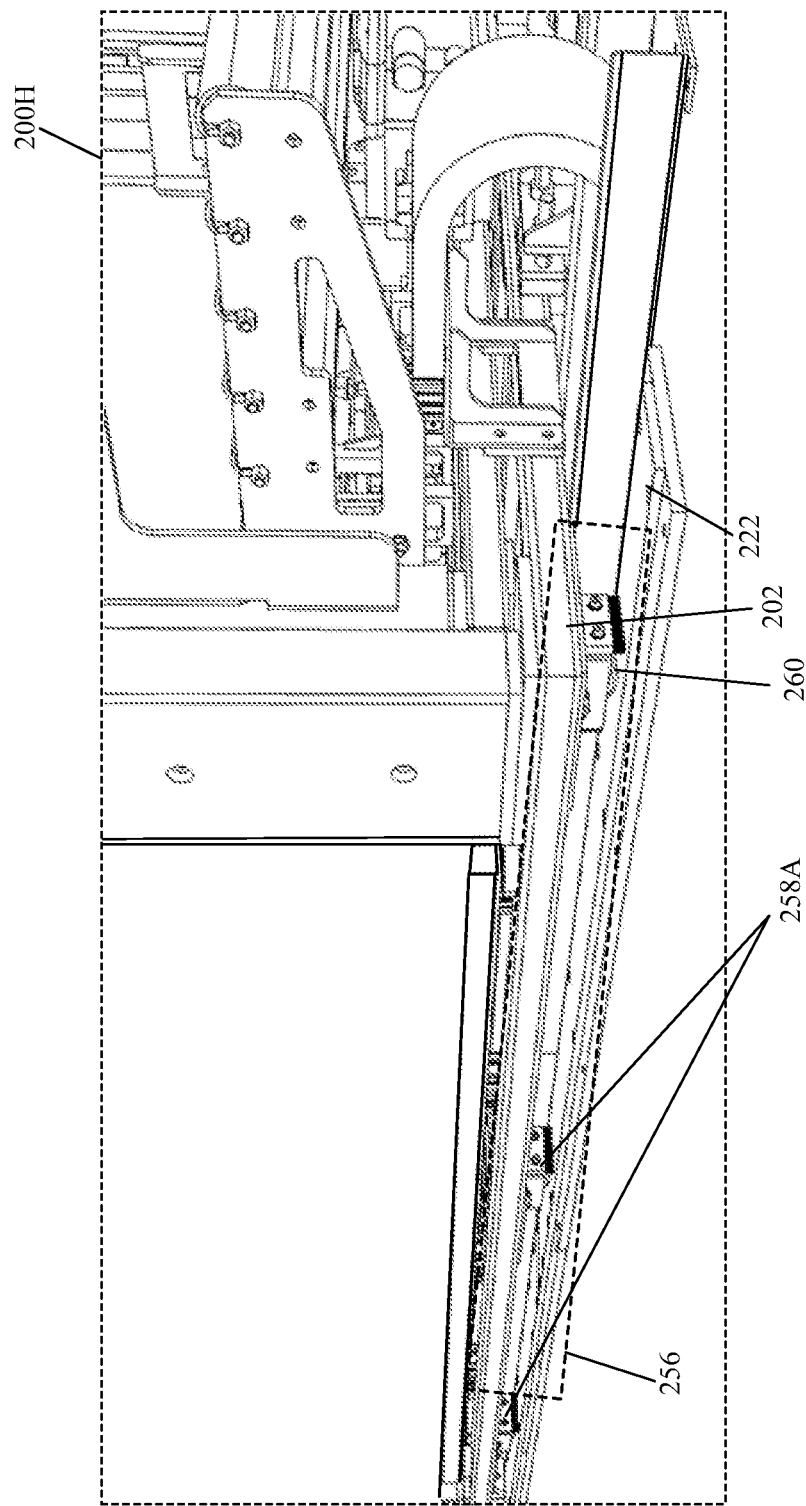
FIG. 2I illustrates a third drive assembly and a wheel arrangement of the transfer apparatus, in accordance with an embodiment of the disclosure.

FIG. 2G and FIG. 2H collectively, illustrate a lifting mechanism to move the first conveyor assembly and the second conveyor assembly in a vertical plane, in accordance with an embodiment of the disclosure. FIG. 2G and FIG. 2H are explained in conjunction with elements from FIGS. 1A, 1B, 1C, 2A, 2B, 2C, 2D, 2E, and 2F. With reference to FIG. 2G and FIG. 2H, there is shown an enlarged view 200F and an enlarged view 200G of a lifting mechanism to move the first conveyor assembly 206 and the second conveyor assembly 208 in a vertical plane. The first conveyor assembly 206 and the second conveyor assembly 208 may be further collectively movable along the third axis 214C in the vertical plane based on the lifting mechanism.

The lifting mechanism may raise an object at a required height and transfer the object to a raised collection point (for example, conveyor lifts). The lifting mechanism may be the second drive assembly 246 that may include a second motor 248 coupled to a drive shaft 250 and supported on at least one of the plurality of columns 220. The second motor 248 may be placed in a gap between the base plate 202 and the first conveyor assembly 206. The placement of the second motor 248 may advantageously facilitate a reduction in overall height of the first conveyor assembly 206 and the second conveyor assembly 208 from the base plate 202. Such reduction in overall height of the transfer apparatus 102 may facilitate installation in certain facilities that operate under a limited space constraint. The second motor 248 may further drive the coupled drive shaft 250 to move the first conveyor assembly 206 and the second conveyor assembly 208 along the third axis 214C in the vertical plane.

The lifting mechanism may further include the pulley arrangement 212 associated with the second drive assembly 246. The pulley arrangement 212 may include a plurality of pulleys 252 arranged on distal ends of each column of the frame 204 of the transfer apparatus 102. A pair of belts 254 may be further arranged over the plurality of pulleys 252 at distal ends of each column of the frame 204 of the transfer apparatus 102. The drive shaft 250 of the second drive assembly 246 may be further coupled to specific pulleys at the bottom of the first column 220A and the second column 220B, respectively. As the second motor 248 applies a torque on the drive shaft 250, the pair of belts 254 may experience a tension, which may be further utilized to lift the first conveyor assembly 206 and the second conveyor assembly 208 at a desired height in the vertical plane. The desired height to which the first conveyor assembly 206 and the second conveyor assembly 208 may be raised is controlled based on factors, such as a weight of the object, a required torque, and a number of required turns (motor and pulley). The object placed on the first conveyor assembly 206 or the second conveyor assembly 208 may be movable along the third axis 214C in the vertical plane based on the second drive assembly 246. The third axis 214C in the vertical plane may be orthogonal to the first axis 214A and the second axis 214B in the horizontal plane. Similarly, the first axis 214A may be orthogonal to the second axis 214B.

FIG. 2I illustrates a third drive assembly and a wheel arrangement of the transfer apparatus, in accordance with an embodiment of the disclosure. FIG. 2I is explained in conjunction with elements from FIGS. 1A, 1B, 1C, 2A, 2B, 2C, 2D, 2E, 2F, 2G, and 2H. With reference to FIG. 2I, there is shown an enlarged view 200H of a third drive assembly that may be coupled to the wheel arrangement 256 of the transfer apparatus 102.

The third drive assembly may facilitate movement of the entire transfer apparatus 102 along the plurality of guide rail tracks 222. The third drive assembly may include a third motor to move the transfer apparatus 102, using the wheel arrangement 256, back and forth along the plurality of guide rail tracks 222. The wheel arrangement 256 may include a first wheel and brake mechanism 258A longitudinally affixed at a first side of the rectangular base plate 202 and a second wheel and brake mechanism (not shown) longitudinally affixed at a second side of the rectangular base plate 202. The first wheel and brake mechanism 258A and the second wheel and brake mechanism may include a pair of wheels 260 (for example, three pairs of wheels and brakes at each side of the base plate) affixed to the base plate 202 after a defined separation. The pair of wheels 260 may be affixed to optimally support a weight of the transfer apparatus 102 and balance forces caused by variation in a distribution of load on the transfer apparatus 102.

The third drive assembly may be further configured to acquire different objects moving in an assembly line (See FIG. 1A) from different directions and at different heights from the horizontal plane. Such acquisition may be done based on a controlled back and forth movement of the transfer apparatus 102 along the plurality of guide rail track 222 and a movement of the first conveyor assembly 206 and the second conveyor assembly 208 along the first axis 214A, the second axis 214B, and the third axis 214C. Such acquisition and transfer may be further done at a specific speed of transfer that may be associated with a rate of rotation of the first motor, the second motor 248 (as shown in FIG. 2G), and the third motor. The speed of transfer may be measured in terms of a displacement rate of the object along a specific direction. Such displacement rate may further depend on a weight and a size of the object and the weight of the transfer apparatus 102. For example, the displacement rate for the transfer apparatus may be "2.7 meters per second" for an object that may weigh from "0.1 kilograms" to "200 kilograms." Additionally, the transfer apparatus 102 may handle objects that may be associated with varying dimensions, for example, "300 mm by 300 mm" to "2.1 by 1 m."

Although not shown in FIGS. 2A to 2I, the transfer apparatus 102 may further include the control circuitry 114 communicatively coupled to the first drive assembly, the second drive assembly 246, the pivot point arrangement 238, and the third drive assembly. Alternatively stated, the control circuitry 114 may be communicatively coupled to an electronic controller of the first motor, the second motor 248, the third motor, and the actuator of the first drive assembly, the second drive assembly 246, the third drive assembly, and the pivot point arrangement 238, respectively. Such communication may facilitate the control circuitry 114 to calibrate, monitor, and set different operational parameters, for example, speed of rotation, speed of movement of object, displacement, and height of conveyor assemblies, activation/deactivation of pivot point arrangement, and the like.

The control circuitry 114 may be configured to control a movement of the object received at the first conveyor assembly 206 along the first axis 214A, the second axis 214B, and the third axis 214C, respectively. The control circuitry 114 may read a unique identifier associated with the object when the object is within a first defined communication range to the first conveyor assembly 206, for example, near the first section of the first conveyor assembly 206. The movement of the object may be controlled based on the unique identifier associated with object. Such unique identifier may be detected based on an RFID tag affixed to the object received at the first conveyor assembly 206 (as described in FIGS. 1A to 1C).

Although not shown, the transfer apparatus 102 may further include a rotary encoder coupled to each of the first motor, the second motor 248, the third motor, and the actuator of the first drive assembly, the second drive assembly 246, the third drive assembly, and the pivot point arrangement 238, respectively. Each of such rotary encoders may be configured to measure a number of rotations made by each of the first motor, the second motor, the third motor, and the actuator of the first drive assembly, the second drive assembly 246, the third drive assembly, and the pivot point arrangement 238. The control circuitry 114 may be configured to measure, by the rotary encoder, a displacement of the object along the first axis 214A and the second axis 214B. At least one photo sensor may be further affixed to the first conveyor assembly 206 and the second conveyor assembly 208. Thus, the control circuitry 114 may be further configured to determine, by the at least one photo sensor, a relative position of an object placed on the first conveyor assembly 206 or the second conveyor assembly 208 with respect to a reference point along the first axis 214A, the second axis 214B, and the third axis 214C. In some embodiments, the control circuitry 114 may be implemented locally on the transfer apparatus 102. In other embodiments, the control circuitry 114 may be implemented remotely from either a centralized control system or via a cloud server.

Certain embodiments of the disclosure may be found in an apparatus (such as the transfer apparatus 102) for multi-axial transfer of objects in assembly line. Various embodiments of the disclosure may provide an apparatus that may include a base plate (e.g. the base plate 202), a first conveyor assembly (e.g. the first conveyor assembly 206), a second conveyor assembly (e.g., the second conveyor assembly 208), a first drive assembly, and a pivot point arrangement (e.g., the pivot point arrangement 238) associated with the second conveyor assembly. The first conveyor assembly may include a plurality of rollers (e.g., the plurality of rollers 216) arranged spatially and longitudinally to each other in a horizontal plane. At least one of the plurality of rollers may be further coupled to a first gear (e.g., the first gear 210A) of a bevel gear arrangement (e.g., the bevel gear arrangement 210). The second conveyor assembly may include a plurality of geared chain arrangements. Each of the plurality of geared chain arrangements (e.g., the plurality of geared chain arrangements 218) may be arranged alternatively between two consecutive rollers of the plurality of rollers in a first section (e.g., the first section 206A) of the first conveyor assembly. The plurality of geared chain arrangements may be mounted on at least one drive shaft that may be coupled to a second gear (e.g., the second gear 210B) of the bevel gear arrangement. Thereafter, the first drive assembly may include a first motor coupled to one of the first gear or the second gear of the bevel gear arrangement. The first motor may drive the bevel gear arrangement to cause movement of an object in contact with the first conveyor assembly along a first axis and the second conveyor assembly along a second axis in the horizontal plane. Additionally, the pivot point arrangement may include a plurality of pivot points associated with the plurality of geared chain arrangements of the second conveyor assembly. The plurality of geared chain arrangements may be movable along a third axis in a vertical plane to switch the contact of the object between the first conveyor assembly and the second conveyor assembly.

In accordance with an embodiment, the apparatus may further include a second drive assembly that may include a second motor coupled to a drive shaft supported on at least one of a plurality of columns. The second motor may drive the drive shaft to move the first conveyor assembly and the second conveyor assembly along the third axis in the vertical plane. An object placed on the first conveyor assembly or the second conveyor assembly may be movable along the third axis in the vertical plane based on the second drive assembly. The third axis in the vertical plane may be orthogonal to the first axis and the second axis in the horizontal plane, and the first axis may be further orthogonal to the second axis.

The first conveyor assembly may further include a first stopper and a second stopper arranged in gaps between a different pair of rollers in the plurality of rollers. The first stopper may be positioned at a defined separation from the second stopper. The first stopper and the second stopper may correspond to transfer guide points on the first conveyor assembly to manage transfer of different objects of different sizes. The apparatus may further include an actuator. The first stopper and the second stopper may be coupled to the actuator that may raise the first stopper and the second stopper in the vertical plane.

In accordance with an embodiment, the apparatus may further include a frame coupled with the base plate and a pulley arrangement associated with the second drive assembly. The frame may include a plurality of columns affixed on a first end of the base plate such that each column is affixed with the pulley arrangement associated with the second drive assembly.

The apparatus may further include a control circuitry communicatively coupled to the first drive assembly, the second drive assembly, and the pivot point arrangement. The control circuitry may be configured to control a movement of the object received at the first conveyor assembly along the first axis, the second axis, and the third axis. The control circuitry is further configured to read a unique identifier associated with the object when the object is within a first defined communication range to the first conveyor assembly. The movement of the object may be controlled based on the unique identifier associated with object. The unique identifier may be detected based on a radio frequency identification (RFID) tag affixed to the object that may be received at the first conveyor assembly.

In accordance with an embodiment, the apparatus may further include a rotary encoder coupled to the first motor of the first drive assembly and a second motor of a second drive assembly. The rotary encoder may be configured to measure a number of rotations made by the first motor of the first drive assembly and the second motor of the second drive assembly. Additionally, the apparatus may further include at least one photo sensor affixed to the first conveyor assembly and the second conveyor assembly. The control circuitry may be further configured to measure, by the rotary encoder, a displacement of the object along the first axis and the second axis. Similarly, the control circuitry may be further configured to determine, by the at least one photo sensor, a relative position of the object placed on the first conveyor assembly or the second conveyor assembly with respect to a reference point along the first axis, the second axis and the third axis.

In accordance with an embodiment, the apparatus may further include a wheel arrangement mounted on a second end of the base plate. The wheel arrangement may be mounted on a guide rail track to facilitate back and forth movement of the apparatus along the horizontal plane. The apparatus may further include a third drive assembly that may include a third motor to move the apparatus, using the wheel arrangement, back and forth along the guide rail track.

The third drive assembly may be configured to acquire different objects moving in an assembly line from different directions and at different heights from the horizontal plane. Different objects may be acquired based on a controlled back and forth movement of the apparatus along the guide rail track and a movement of the first conveyor assembly and the second conveyor assembly along the first axis, the second axis, and the third axis.

In accordance with an embodiment, the apparatus may further include a first support fixture and a second support fixture arranged parallel to the first support fixture. The plurality of rollers may be mounted between the first support fixture at a first distal end and the second support fixture at a second distal end of the plurality of rollers. In accordance with an embodiment, the direction of movement of the object along the first axis and the second axis may be determined based on a type of rotation of the bevel gear arrangement. The first motor of the first drive assembly may be driven based on a rack and pinion gear arrangement.

While the present disclosure has been described with reference to certain embodiments, it will be understood by those skilled in the art that various changes may be made and equivalents may be substituted without departing from the scope of the present disclosure. Additionally, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

As used herein, the terms "comprises," "comprising," "includes," "including," "has," "having" or any contextual variants thereof, are intended to cover a non-exclusive inclusion. For example, a process, product, article, or apparatus that comprises a list of elements is not necessarily limited to only those elements, but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present).

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, reversed, or otherwise controlled by another process. It will also be appreciated that one or more of the elements depicted in the drawings/figures can also be implemented in a more separated or integrated manner, or even removed or rendered as inoperable in certain cases, as is useful in accordance with a particular application.

What is claimed is:

1. An apparatus for multi-axial transfer of objects, comprising:
 a base plate;

a first conveyor assembly that comprises a plurality of rollers arranged spatially and longitudinally to each other in a horizontal plane, wherein at least one of the plurality of rollers is coupled to a first gear of a bevel gear arrangement, the first conveyor assembly further including a first stopper arranged in a first gap between a pair of rollers of the plurality of rollers and a second stopper arranged in a second gap between a second pair of rollers of the plurality of rollers, wherein the first stopper is at a defined separation from the second stopper;

a second conveyor assembly that comprises a plurality of geared chain arrangements, wherein each of the plurality of geared chain arrangements is arranged alternatively between two consecutive rollers of the plurality of rollers in a first section of the first conveyor assembly, and wherein the plurality of geared chain arrangements are mounted on at least one drive shaft that is coupled to a second gear of the bevel gear arrangement;

a first drive assembly that comprises a first motor coupled to one of the first gear or the second gear of the bevel gear arrangement, wherein the first motor drives the bevel gear arrangement to cause movement of an object in contact with the first conveyor assembly along a first axis and the second conveyor assembly along a second axis in the horizontal plane; and a pivot point arrangement that comprises a plurality of pivot points associated with the plurality of geared chain arrangements of the second conveyor assembly, wherein the plurality of geared chain arrangements are movable along a third axis in a vertical plane to switch the contact of the object between the first conveyor assembly and the second conveyor assembly.

2. The apparatus according to claim 1, wherein a direction of movement of the object along the first axis and the second axis is determined based on a type of rotation of the bevel gear arrangement.

3. The apparatus according to claim 1, further comprising a second drive assembly that comprises a second motor coupled to a drive shaft supported on at least one of a plurality of columns, wherein the second motor drives the drive shaft to move the first conveyor assembly and the second conveyor assembly along the third axis in the vertical plane.

4. The apparatus according to claim 3, wherein the object placed on the first conveyor assembly or the second conveyor assembly is movable along the third axis in the vertical plane based on the second drive assembly.

5. The apparatus according to claim 4, wherein the third axis in the vertical plane is orthogonal to the first axis and the second axis in the horizontal plane, and wherein the first axis is orthogonal to the second axis.

6. The apparatus according to claim 1, wherein the first stopper and the second stopper correspond to transfer guide points on the first conveyor assembly to manage transfer of different objects of different sizes.

7. The apparatus according to claim 1, further comprising an actuator, wherein the first stopper and the second stopper are coupled to the actuator that raises the first stopper and the second stopper in the vertical plane.

8. The apparatus according to claim 1, further comprising:
a frame coupled with the base plate; and
a pulley arrangement associated with a second drive assembly,
wherein the frame comprises a plurality of columns affixed on a first end of the base plate such that each column is affixed with the pulley arrangement associated with the second drive assembly.

9. The apparatus according to claim 1, further comprising a first support fixture and a second support fixture arranged parallel to the first support fixture, wherein the plurality of rollers are mounted between the first support fixture at a first distal end and the second support fixture at a second distal end of the plurality of rollers.

10. The apparatus according to claim 1, further comprising a control circuitry communicatively coupled to the first drive assembly, a second drive assembly and the pivot point arrangement, and wherein the control circuitry is configured to control a movement of the object received at the first conveyor assembly along the first axis, the second axis, and the third axis.

11. The apparatus according to claim 10, wherein the control circuitry is further configured to read a unique identifier associated with the object when the object is within a first defined communication range to the first conveyor assembly, and wherein the movement of the object is controlled based on the unique identifier associated with object.

12. The apparatus according to claim 11, wherein the unique identifier is detected based on a radio frequency identification (RFID) tag affixed to the object that is received at the first conveyor assembly.

13. The apparatus according to claim 10, wherein the control circuitry is further configured to measure, by a rotary encoder, a displacement of the object along the first axis and the second axis.

14. The apparatus according to claim 10, wherein the control circuitry is further configured to determine, by at least one photo sensor, a relative position of the object placed on the first conveyor assembly or the second conveyor assembly with respect to a reference point along the first axis, the second axis and the third axis.

15. The apparatus according to claim 1, further comprising:
a rotary encoder coupled to the first motor of the first drive assembly and a second motor of a second drive assembly, wherein the rotary encoder is configured to measure a number of rotations made by the first motor of the first drive assembly and the second motor of the second drive assembly; and
at least one photo sensor affixed to the first conveyor assembly and the second conveyor assembly.

16. The apparatus according to claim 1, wherein the first motor of the first drive assembly is driven based on a rack and pinion gear arrangement.

17. An apparatus for multi-axial transfer of objects, comprising:
a base plate;
a first conveyor assembly that comprises a plurality of rollers arranged spatially and longitudinally to each other in a horizontal plane, wherein at least one of the plurality of rollers is coupled to a first gear of a bevel gear arrangement;
a second conveyor assembly that comprises a plurality of geared chain arrangements, wherein each of the plurality of geared chain arrangements is arranged alternatively between two consecutive rollers of the plurality of rollers in a first section of the first conveyor assembly, and wherein the plurality of geared chain arrangements are mounted on at least one drive shaft that is coupled to a second gear of the bevel gear arrangement;

a first drive assembly that comprises a first motor coupled to one of the first gear or the second gear of the bevel gear arrangement, wherein the first motor drives the bevel gear arrangement to cause movement of an object in contact with the first conveyor assembly along a first axis and the second conveyor assembly along a second axis in the horizontal plane;

a pivot point arrangement that comprises a plurality of pivot points associated with the plurality of geared chain arrangements of the second conveyor assembly, wherein the plurality of geared chain arrangements are movable along a third axis in a vertical plane to switch the contact of the object between the first conveyor assembly and the second conveyor assembly; and a wheel arrangement mounted on the base plate, wherein the wheel arrangement is mounted on a guide rail track to facilitate back and forth movement of the apparatus along the horizontal plane.

18. The apparatus according to claim 17, further comprising a third drive assembly that comprises a third motor to move the apparatus, using the wheel arrangement, back and forth along the guide rail track.

19. The apparatus according to claim 18, wherein the third drive assembly is configured to acquire different objects moving in an assembly line from different directions and at different heights from the horizontal plane, based on a controlled back and forth movement of the apparatus along the guide rail track and a movement of the first conveyor assembly and the second conveyor assembly along the first axis, the second axis, and the third axis.

* * * * *